United States Patent
Muller et al.

(10) Patent No.: US 10,754,952 B2
(45) Date of Patent: Aug. 25, 2020

(54) HOST SOFTWARE METADATA VERIFICATION DURING REMOTE ATTESTATION

(71) Applicant: VMware, Inc., Palo Alto, CA (US)

(72) Inventors: Daniel Muller, Palo alto, CA (US); Samyuktha Subramanian, Mountain View, CA (US); Mukund Gunti, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 16/042,338

(22) Filed: Jul. 23, 2018

(65) Prior Publication Data

US 2020/0026857 A1    Jan. 23, 2020

(51) Int. Cl.
*G06F 21/57* (2013.01)
*G06F 21/64* (2013.01)
*G06F 21/12* (2013.01)
*H04L 9/32* (2006.01)

(52) U.S. Cl.
CPC .............. *G06F 21/57* (2013.01); *G06F 21/12* (2013.01); *G06F 21/64* (2013.01); *H04L 9/3247* (2013.01); *H04L 2209/127* (2013.01)

(58) Field of Classification Search
CPC .......... G06F 21/57; G06F 21/64; G06F 21/12; H04L 9/3247; H04L 2209/127; H04L 9/3234
See application file for complete search history.

(56) References Cited

U.S. PATENT DOCUMENTS

| | | | | |
|---|---|---|---|---|
| 2004/0193888 A1* | 9/2004 | Wiseman | ............... | G06F 21/64 713/176 |
| 2008/0098107 A1* | 4/2008 | Jones | ............... | H04L 63/1425 709/224 |
| 2008/0256595 A1* | 10/2008 | Schunter | ............... | G06F 21/57 726/1 |
| 2008/0288783 A1* | 11/2008 | Jansen | ............... | G06F 21/57 713/189 |
| 2010/0161998 A1* | 6/2010 | Chen | ............... | G06F 21/57 713/189 |
| 2011/0067095 A1* | 3/2011 | Leicher | ............... | H04L 63/062 726/10 |
| 2012/0266213 A1* | 10/2012 | Spiers | ............... | G06F 9/45533 726/3 |

(Continued)

*Primary Examiner* — J. Brant Murphy
(74) *Attorney, Agent, or Firm* — Patterson + Sheridan, LLP

(57) ABSTRACT

An example method of authenticating software executing in a computer system includes: receiving, from the computer system over a network at a server computer, a trusted platform module (TPM) quote, an event log, and a metadata database, the TPM quote provided by a TPM in the computer system, the event log including first checksums for the software executing in the computer system, and the metadata database including second checksums of binary files stored in packages from which the software is installed; establishing a root of trust in the computer system at the server computer based on the TPM quote and the event log; and determining, at the server computer in response to establishing the root of trust, integrity of the software executing in the computer system by comparing the first checksums with the second checksums.

20 Claims, 5 Drawing Sheets

(56) References Cited

U.S. PATENT DOCUMENTS

| | | | | |
|---|---|---|---|---|
| 2012/0324236 A1* | 12/2012 | Srivastava | ............ | H04L 9/3234 713/189 |
| 2013/0198838 A1* | 8/2013 | Schmidt | ................ | H04L 9/3265 726/22 |
| 2016/0306975 A1* | 10/2016 | Schmidt | ................ | H04W 12/08 |
| 2017/0093800 A1* | 3/2017 | Wiseman | .............. | H04L 9/3247 |

* cited by examiner

HOST SOFTWARE METADATA VERIFICATION DURING REMOTE ATTESTATION

BACKGROUND

Remote attestation is a mechanism by which a third party authenticates (i.e., establishes trust in) the software of a target computer system (target system). The third party performing remote attestation is referred to herein as a verifier. A verifier can rely on a trusted platform module (TPM) on the target system for establishing a hardware root of trust. The TPM measures the software running on a target system by calculating and storing checksums of software components. The measurement process starts from a trusted state in the TPM hardware. The verifier can ask the target system for checksums of software components as they were loaded. A composite hash of these measurements is referred to herein as a quote. The verifier receives a quote from the target system, which it can then base its trust assessment on.

In order for the verifier to establish trust in the target computer system, the verifier has to first verify the integrity of the software that the target system is running. The target system maintains a record of the individual checksums of each software component running and the order in which the software components were measured by the TPM. This record is referred to herein as an event log, which includes the name and version of each software module. Since the event log is untrusted, the verifier has to check it against the measurements performed by the TPM and then verify the checksums of the individual software components. The verifier can maintain a white-list of software components and their checksums. However, a target system is typically composed of multiple binaries, each of which comprises multiple modules. As such, the white-list maintained by the verifier can become large and difficult to manage and maintain. Over time, the database storing the white list grows unboundedly.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
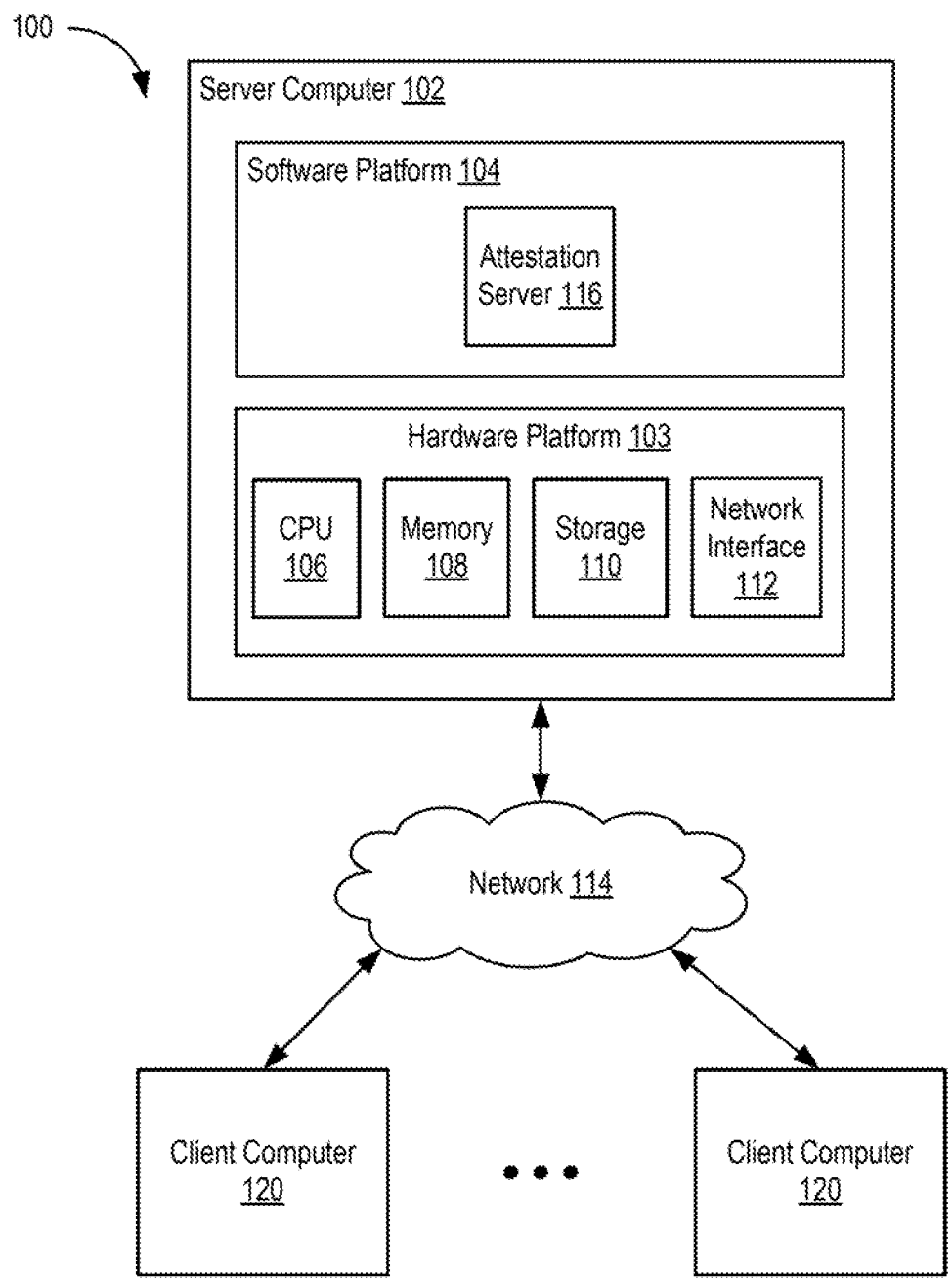
FIG. 1 is a block diagram depicting a computing system according to an embodiment.

FIG. 1 is a block diagram depicting a computing system 100 according to an embodiment. Computing system 100 includes one or more client computers 120 coupled to a server computer 102 through a network 114. Server computer 102 includes a software platform 104 executing on a hardware platform 103. Hardware platform 103 may include conventional components of a computing device, such as a central processing unit (CPU) 106 and system memory 108, a storage system (storage 110), and a network interface 112. CPU 106 is configured to execute instructions, for example, executable instructions that perform one or more operations described herein and may be stored in system memory 108 and storage 110. System memory 108 is a device allowing information, such as executable instructions, virtual disks, configurations, and other data, to be stored and retrieved. System memory 108 may include, for example, one or more random access memory (RAM) modules. Network interface 112 is configured to send and receive data from network 114. Storage 110 includes local storage devices (e.g., one or more hard disks, flash memory modules, solid state disks, and optical disks) and/or a storage interface that enables server computer 102 to communicate with one or more network data storage systems. Examples of a storage interface are a host bus adapter (HBA) that couples server computer 102 to one or more storage arrays, such as a storage area network (SAN) or a network-attached storage (NAS), as well as other network data storage systems.

Software platform 104 includes an attestation server 116. Attestation server 116 can execute within a host operating system (OS). Examples of a host OS include any commodity operating system known in the art, such as such as Linux®, Microsoft Windows®, Mac OS®, or the like. Host OS 124 includes a bootloader 126. Alternatively, attestation server 116 can execute within a guest OS of a virtual machine (VM). In an embodiment, software platform 104 includes a virtualization layer that abstracts processor, memory, storage, and networking resources of hardware platform 103 into one or more virtual machines ("VMs") that run concurrently on server computer 102. The VMs run on top of the virtualization layer, referred to herein as a hypervisor, which enables sharing of the hardware resources by the VMs. One example of a hypervisor that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Attestation server 116 is configured to provide third party authentication for the software installed in client computers 120. That is, attestation server 116 acts as a verifier on behalf of client computers 120. Attestation server 116 functions as described further below.

Figure 2:
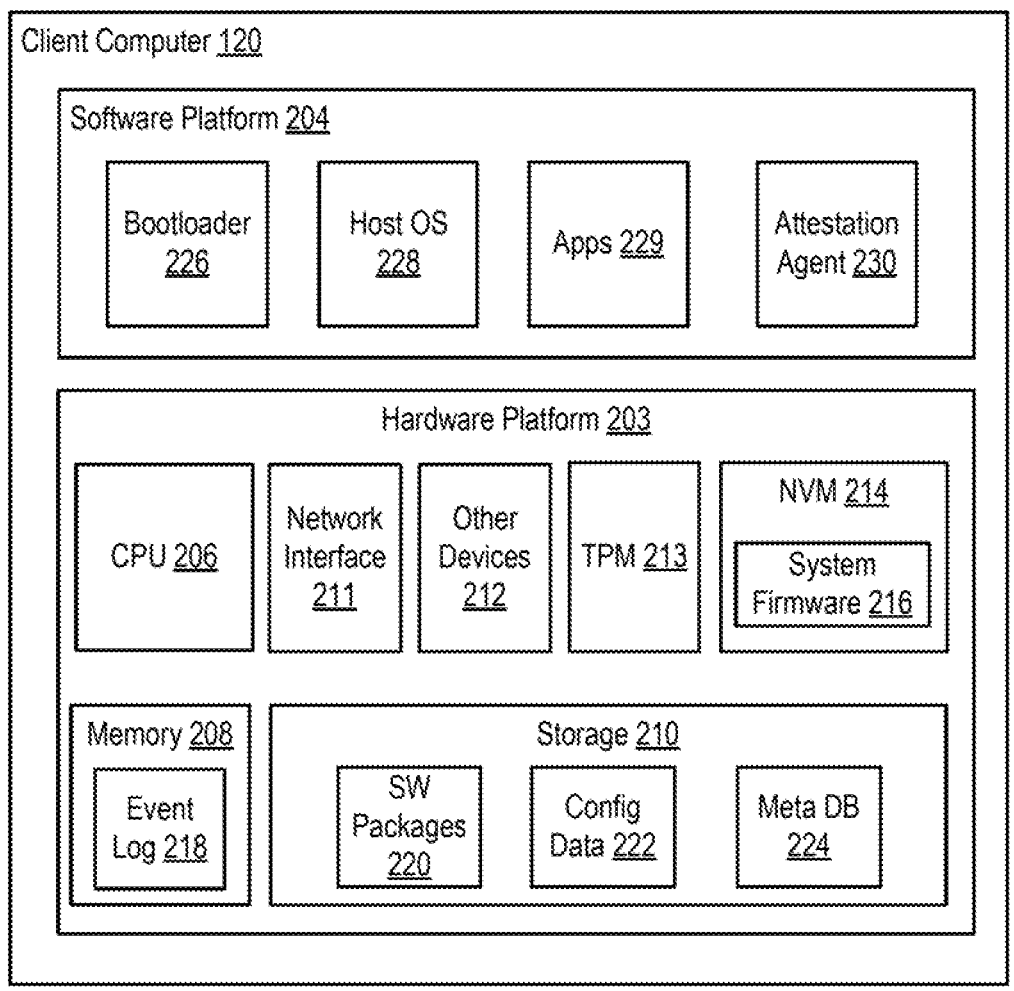
FIG. 2 is a block diagram depicting a client computer according to an embodiment.

FIG. 2 is a block diagram depicting a client computer 120 according to an embodiment. Client computer 120 is a software platform 204 executing on a hardware platform 203. Hardware platform 203 may include conventional components of a computing device, such as a CPU 206 and system memory 208, a storage system (storage 210), a network interface 211, a non-volatile memory (NVM) 214, a trusted platform module (TPM) 213, and one or more other devices 212. CPU 206 is configured to execute instructions, for example, executable instructions that perform one or more operations described herein and may be stored in system memory 208 and storage 210. System memory 208 is a device allowing information, such as executable instructions, virtual disks, configurations, and other data, to be stored and retrieved. System memory 208 may include, for example, one or more RAM modules. Network interface 211 is configured to send and receive data from network 114.

Storage 210 includes local storage devices (e.g., one or more hard disks, flash memory modules, solid state disks, and optical disks) and/or a storage interface that enables client computer 120 to communicate with one or more network data storage systems. Examples of a storage interface are an HBA that couples client computer 120 to one or more storage arrays, such as a SAN or a NAS, as well as other network data storage systems. NVM 214 stores system firmware 216 for initializing client computer 120 upon startup. TPM 213 is a hardware device that provides hardware-based security-related functions. TPM 213 can be a secure crypto-processor designed to perform cryptographic operations. TPM 213 typically includes multiple physical security mechanism to make it tamper resistant.

Software platform 204 includes a host OS 228, a bootloader 226, applications (apps 229), and an attestation agent 230. Bootloader 226 is configured to be invoked by system firmware 216 upon startup of client computer 120. Host OS 228 can be any commodity operating system known in the art, such as Linux®, Microsoft Windows®, Mac OS®, or the like. Alternatively, host OS 228 can be a hypervisor. Apps 229 include software the execution of which is managed by host OS 228. Attestation agent 230 is configured to cooperate with attestation server 116. In general, boot loader 226, host OS 228, apps 229, and attestation agent 230 include a plurality of software components of software platform 204 that are executed in a particular order as client computer 220 starts up.

In an embodiment, the software components of software platform 204 are installed from software packages (SW packages 220). SW packages 220 can be stored in storage 210 or can be obtained over network 114. The software components of software platform 204 are installed from SW packages 220 on every boot. That is, client component 120 is boot strapped from SW packages 220 every time client computer 120 starts up. Each installation of a SW package 220 is accompanied by a measurement of a checksum of one or more software components therein by TPM 213. In an embodiment, software platform 204 can have some persistence in the form of configuration data (config data 222) maintained in storage 210. Config data 222 can be persistent from one boot to the next.

In particular, TPM 213 is configured to generate cryptographic data in response to measuring the running software components of software platform 204. The cryptographic data depends on the order in which the software components were executed. A different order of the same software components generates different cryptographic data. In embodiments, TPM 213 generates a hash using a one-way hash function based on the particular software components and the particular order in which the software components were executed. Upon request, TPM 213 generates a quote having the hash. TPM 213 signs the quote using a securely stored private key of a public/private key pair. The private key is stored securely in TPM 213. For example, attestation server 116 can request a quote from TPM 213 through attestation agent 230. Attestation agent 230 then returns the quote to attestation server 116. In some embodiments, attestation agent 230 can also send the public key of TPM 213.

In addition, host OS 228 is configured to generate an event log 218. Event log 218 can be stored in memory 208 or storage 210. Event log 218 includes identification information for each software component executing in software platform 204. Event log 218 further includes the order in which the software components were executed and checksums for each of the software components. Each checksum can be a hash generated by a respective software component, for example.

Figure 3:
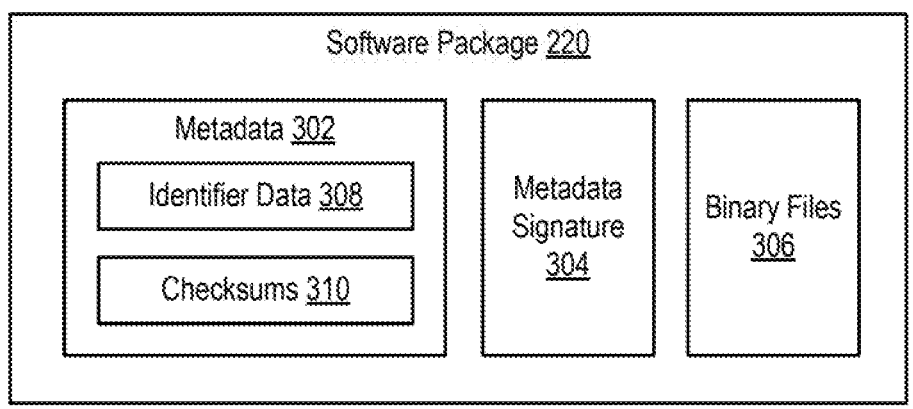
FIG. 3 is a block diagram depicting a software package according to an embodiment.

FIG. 3 is a block diagram depicting a software package 220 according to an embodiment. Software package 220 includes metadata 302, a metadata signature 304, and binary files 306. Binary files 306 are executable by CPU 206 to implement software components of software platform 204. Metadata 302 includes identifier data 308 and checksums 310. Identifier data 308 identifies binary files 306 (e.g., file names). Checksums 310 include hashes or the like of binary files 306. Metadata signature 304 is generated based on metadata 302 using a private key of a public/private key pair controlled by the provider of software package 220. Software package 220 can be authenticated by verifying metadata signature 304 using the public key of the public/private key pair and then verifying checksums of binary files 306 against checksums 310.

Returning to FIG. 2, host OS 228 can generate metadata database (meta DB 224). Meta DB 224 includes metadata 302 from software packages 220, part of which may already be installed in software platform 204 along with the corresponding metadata signature 304. Host OS 228 can extract metadata 302 and metadata signature 304 from each software package 304.

Figure 4:
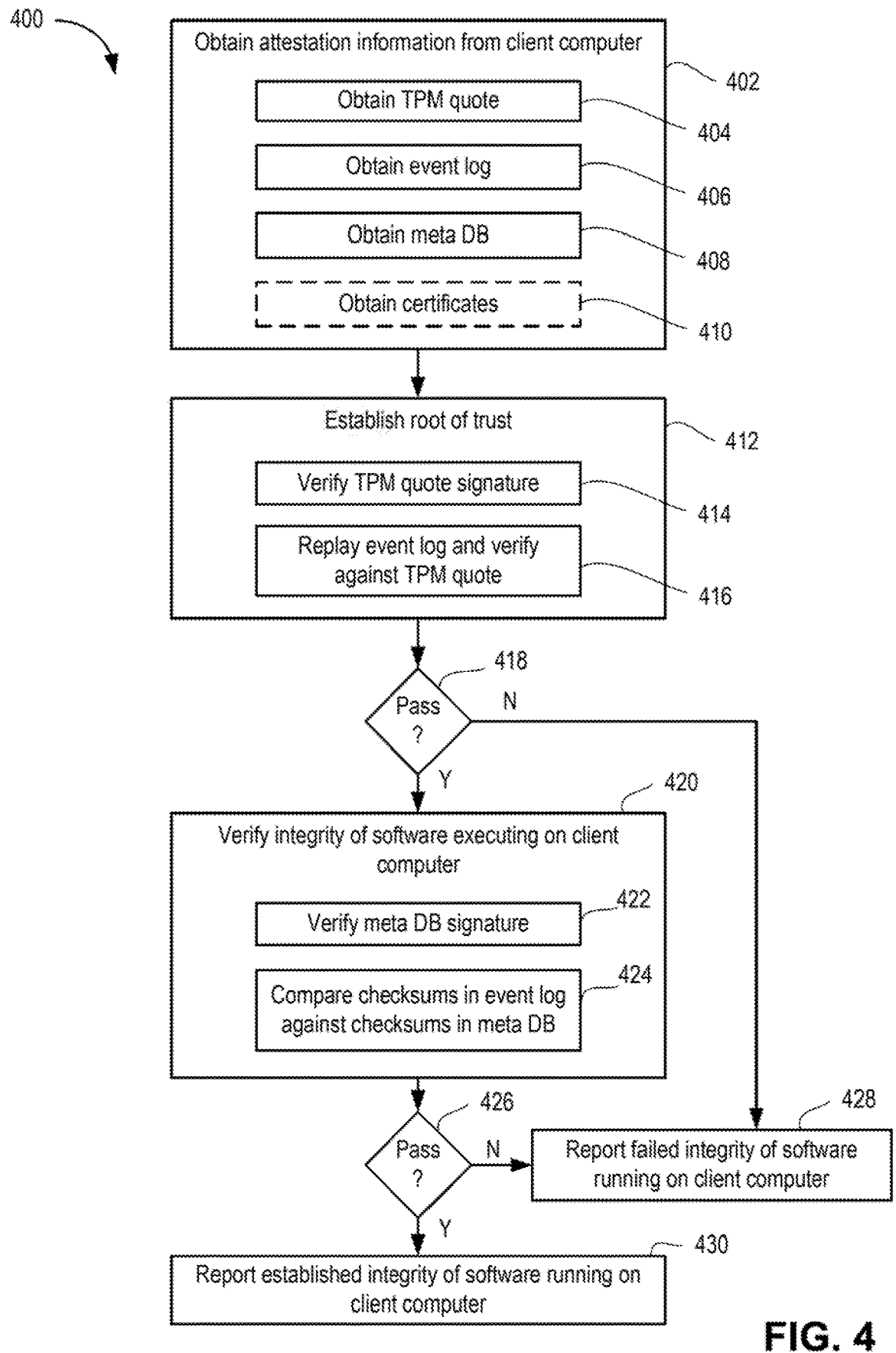
FIG. 4 is a flow diagram depicting a method of authenticating software executing in a computer system according to an embodiment.

FIG. 4 is a flow diagram depicting a method 400 of authenticating software executing in a computer system according to an embodiment. Method 400 can be performed by attestation server 116 to authenticate software executing in client computers 120. Method 400 begins at step 402, where attestation server 116 obtains attestation information from client computer 120. In an embodiment, at step 404, attestation server 116 obtains a TPM quote generated by TPM 213. At step 406, attestation server 116 obtains event log 218 from client computer 120. At step 408, attestation server 116 obtains meta DB 224 from client computer 120. Attestation server 116 can cooperate with attestation agent 230 to obtain the attestation information. In an embodiment, at step 410, attestation server 116 obtains digital certificates from client computer 120 (e.g., through attestation agent 230). The digital certificates can be used to verify the integrity of public keys provided in attestation information. For example, attestation agent 230 can provide a public key from TPM 213 and/or public keys associated with SW packages 220.

At step 412, attestation server 116 establishes a root of trust in client computer 120. In an embodiment, at step 414, attestation server 116 verifies the signature of the TPM quote using the TPM's public key. In an embodiment, attestation server 116 can verify the integrity of the TPM's public key using an appropriate digital certificate. At step 416, attestation server 116 replays event log 218 and verifies the result against the TPM quote. As discussed above, TPM 213 generates the hash based on the specific order in which the software components are executed. Attestation server 116 can use the same algorithm used by TPM 213 to generate a hash based on the checksums of the software components and the order of the software components as set forth in event log 218. If the hashes match, then attestation server 116 establishes a root of trust in event log 218. Otherwise, attestation sever 116 can indicate that event log 218 is not trusted.

At step 418, attestation server 116 determines whether the root of trust has been established. If so, method 400 proceeds to step 420. Otherwise, method 400 proceeds to step 428, where attestation server 116 reports failed integrity of the software running on client computer 120. At step 420, attestation server 116 verifies the integrity of software executing on client computer 120. In an embodiment, at step 422, attestation server 116 verifies one or more signatures in meta DB 224. For example, attestation server 116 obtains the appropriate public keys and/or digital certificates to verify each signature in meta DB 224. At step 424, attestation server 116 compares the checksums in event log 218 against the corresponding checksums in meta DB 224. That is, for each software component in event log 218, attestation server 116 compares its checksum as indicated in event log 218 against a checksum of the software component as indicated in meta DB 224. Since attestation server 116 trusts meta DB 224 (based on validation of the digital signatures), attestation server 116 deems the checksums stored therein as being valid. If any checksums fail to match, then attestation server 116 can deem the client as untrusted. If all checksums match, then attestation server 116 can deem the event log as trusted.

At step 426, attestation server 116 determines whether integrity has been established for the software executing in client computer 120. If not, method 400 proceeds to step 428. If so, method 400 proceeds to step 430. At step 430, attestation server 116 reports the established integrity of the software running on client computer 120. In this manner, other systems can trust client computer 120 has a trusted software configuration before interacting with client computer 120. Also, since attestation server 116 obtains meta DB 224 from client computer 120 to use for verification of software component checksums, attestation server 116 is not required to store a large and unwieldy database for a white-list. This conserves storage in server computer 102, as well as compute resources necessary for obtaining and managing a white-list database.

Remote attestation can also be performed for virtual machines (VMs) that include virtualized TPMs (vTPMs), that is, TPM devices emulated in software. However, one additional problem pertaining to attesting VMs is that their trustworthiness non only depends on the software executing therein, but also on the hypervisor in which the VMs are executing (e.g., the host computer). In embodiments, techniques described herein solve this problem by coupling the vTPM to the physical TPM by introducing another asymmetric key pair that will reside on the host computer. The public portion of this key pair is known to the attesting entity. The private portion of this key pair is used to sign an object uniquely identifying the VM. By providing this signed object whose signature can be checked by third party verifiers, it is possible to tie a trusted VM to a trusted host computer.

Attestation keys (AKs) are TPM-resident keys (i.e., keys where the private portion never leaves the TPM) that are generated for the purpose of platform authentication. The AKs help establish trust only within the system they are activated on. Endorsement keys (EKs) are TPM-resident encryption-only keys that are embedded into the TPM at the point of manufacturing. The following terminology is used below: Remote Attestation Verifier for the Host: $AV_{host}$; Remote Attestation Verifier for the VM: $AV_{VM}$; Endorsement Key (Host): $EK_{host}$; Attestation Key (Host): $AK_{host}$; Attestation Key (VM): $AK_{VM}$; Binding Key: $BK_{host/VM}$; and VM unique identifier: $VM_{id}$. The techniques discussed below depend on (a) $AV_{host}$ already having run and established trust in the host (e.g., using the techniques described above); and (b) $AV_{VM}$ already having run and established trust in the VM (e.g., using the techniques described above). In embodiments, a binding is established between the host computer and the VM, as described further below.

Figure 5:
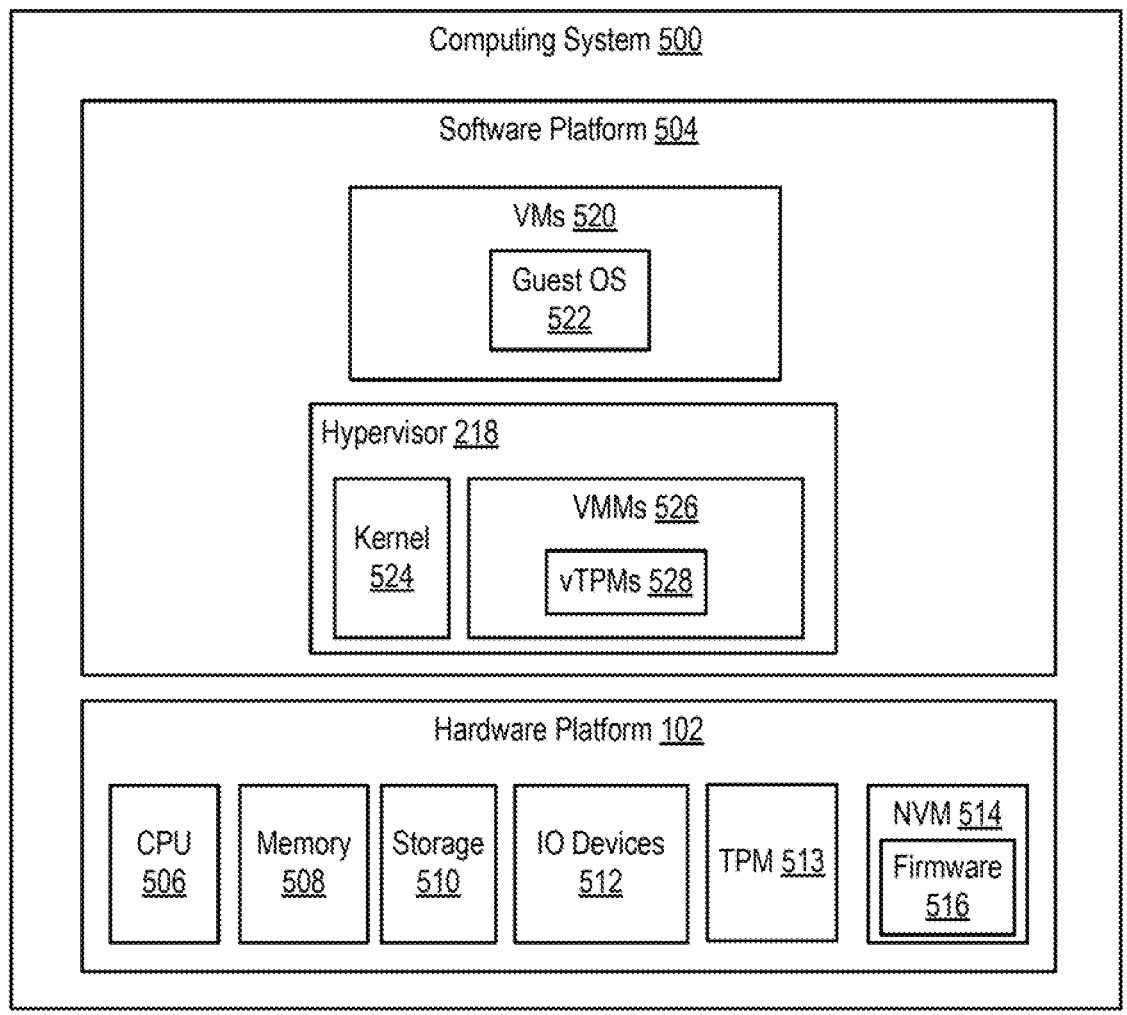
FIG. 5 is a block diagram depicting a computing system according to an embodiment.

FIG. 5 is a block diagram depicting a computing system 500 according to an embodiment. Computing system 500 includes a software platform 504 executing on a hardware platform 502. Hardware platform 502 may include conventional components of a computing device, such as a central processing unit (CPU) 506, system memory ("memory" 508), storage 510, input/output (TO) devices 512, a non-volatile memory (NVM) 514. CPU 506 is configured to execute instructions, for example, executable instructions that perform one or more operations described herein and may be stored in memory 508 and storage 510. Memory 508 is a device allowing information, such as executable instructions, virtual disks, configurations, and other data, to be stored and retrieved. Memory 508 may include, for example, one or more random access memory (RAM) modules. Storage 510 includes local storage devices (e.g., one or more hard disks, flash memory modules, solid state disks, and optical disks) and/or a storage interface that enables computing system 500 to communicate with one or more network data storage systems. Examples of a storage interface are a host bus adapter (HBA) that couples computing system 500 to one or more storage arrays, such as a storage area network (SAN) or a network-attached storage (NAS), as well as other network data storage systems. IO devices 512 include conventional interfaces known in the art, such as one or more network interfaces, serial interfaces, universal serial bus (USB) interfaces, and the like. NVM 514 is a device allowing information to be stored persistently regardless of the state of power applied to computing system 500 (e.g., FLASH memory or the like). NVM 514 stores firmware 516 for computing system 500, such as a Basic Input/Output System (BIOS), Unified Extensible Firmware Interface (UEFI), or the like. TPM 213 is a hardware device that provides hardware-based security-related functions. TPM 213 can be a secure crypto-processor designed to perform cryptographic operations. TPM 213 typically includes multiple physical security mechanism to make it tamper resistant.

Software platform 504 includes a virtualization layer that abstracts processor, memory, storage, and networking resources of hardware platform 502 into one or more virtual machines ("VMs") 520 (collectively VMs 520) that run concurrently on computing system 500. VMs 520 run on top of the virtualization layer, referred to herein as a hypervisor 518, which enables sharing of the hardware resources by VMs 520. One example of hypervisor 518 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 518 is known as a Type-1 or "bare-metal" virtualization software. In other embodiments, hypervisor 518 can be a Type-2 hypervisor that executes within an underlying OS.

Each VM 520 supported by hypervisor 518 includes guest software that runs on the virtualized resources supported by hardware platform 502. In the example shown, the guest software of each VM 520 includes a guest OS 522. Guest OS 522 can be any commodity operating system known in the art, such as such as Linux®, Microsoft Windows®, Mac OS®, or the like. VM 520 can also include various applications (not shown) that execute therein in with support of guest OS 522.

Hypervisor 518 includes, among other components, a kernel 524 and virtual machine monitors (VMMs) 526

(collectively VMMs 526). VMMs 526 provide vTPMs 528 for use by VMs 520. Each vTPM 528 provides the same or similar functionality as TPM 513, but for a respective VM 520 instead of for computing system 500. Kernel 524 provides operating system functionality (e.g., process creation and control, file system, process threads, etc.), as well as CPU scheduling and memory scheduling. VMMs 526 are processes scheduled by kernel 524 to implement the virtual system support for VMs 520. Each VMM 526 manages a corresponding virtual hardware platform. The virtual hardware platform includes virtual CPUs (vCPUs), guest physical memory, virtual IO devices, and the like. At power-on of computing system 500, firmware 516 performs initialization of hardware platform 502. Firmware 516 hands of execution to a bootloader of hypervisor 518. The bootloader performs various initialization tasks.

Figure 6:
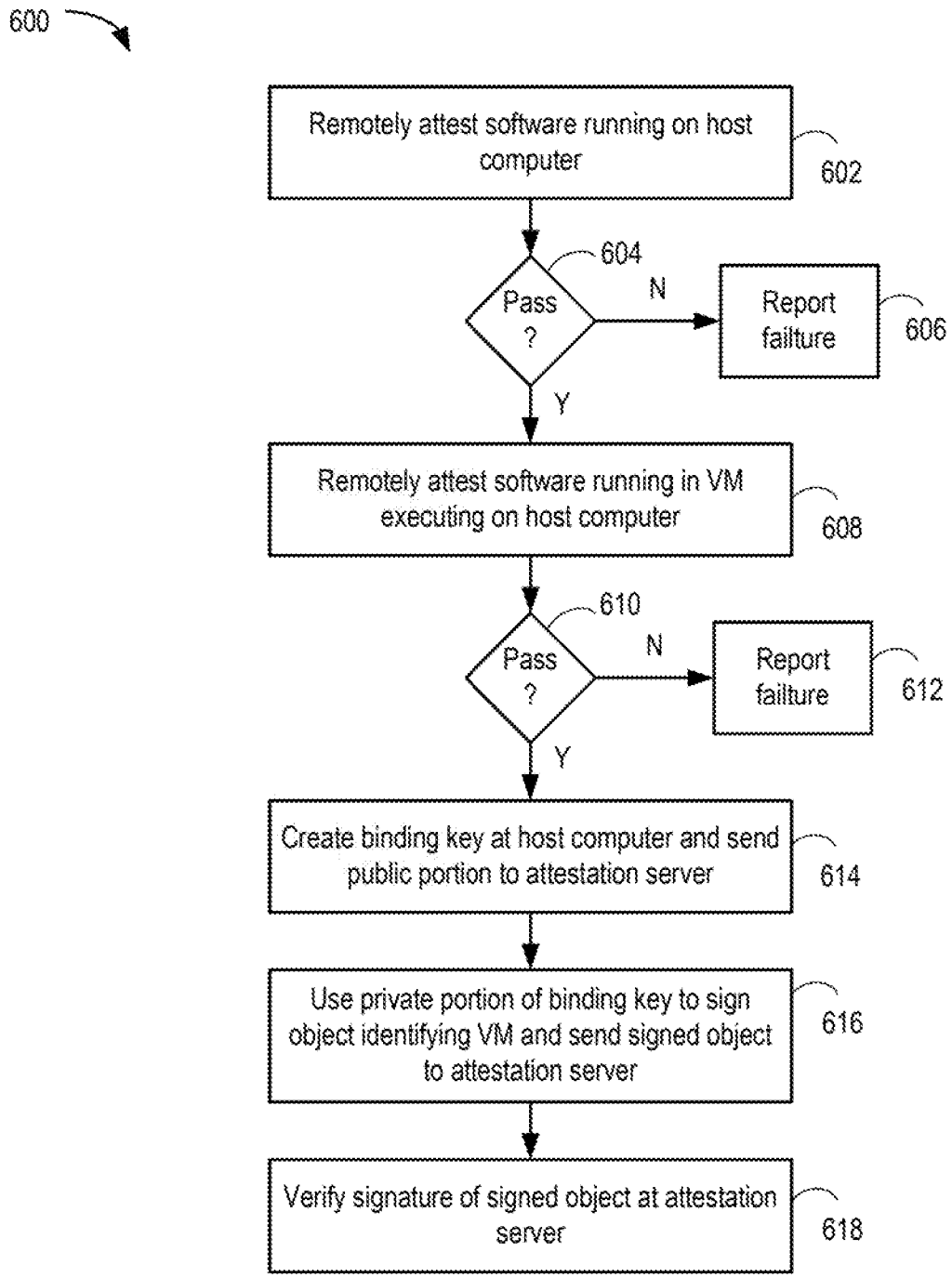
FIG. 6 is a flow diagram depicting a method of authenticating software executing in a virtual machine according to an embodiment.

FIG. 6 is a flow diagram depicting a method 600 of authenticating software executing in a virtual machine according to an embodiment. Method 600 can be performed by attestation server 116 and computing system 500 to authenticate software executing in VMs 520. Method 600 begins at step 602, where attestation server 116 remotely attests software running on computing system 500. Attestation server 116 can perform step 602 using the methods described above (e.g., as shown in FIG. 4). At step 604, attestation server 116 determines whether the software running on computing system 500 is authenticated. If not, method 600 proceeds to step 606 and reports failure. Otherwise, method 600 proceeds to step 608.

At step 608, attestation server 116 remotely attests software running in a VM 520 executing in computing system 500. Attestation server 116 can perform step 608 using the methods described above (e.g., as shown in FIG. 4), but using a vTPM in place of a TPM and VM 520 in place of computing system 500. In an embodiment, a different attestation server (other than attestation sever 116) can verify VM 502. At step 610, attestation server 116 determines whether the software running on VM 502 is authenticated. If not, method 600 proceeds to step 612 and reports failure. Otherwise, method 600 proceeds to step 614.

At step 614, computing system 500 creates a binding key ($BK_{host/VM}$) for the purpose of establishing a trusted binding between VM 520 and computing system 500. In an embodiment, hypervisor 518 creates the binding key. The binding key is an ephemeral key and hypervisor 518 recreates the binding key on every successful completion of step 602. The binding key is an asymmetric key pair having public and private portions. Hypervisor 518 provides the public portion of the binding key to remote attestation server 116 (or any other remote attestation server). The remote attestation server can then add the public portion of the binding key to a white-list of binding keys it trusts. The private portion of the binding key is secure within the TPM 513.

At step 616, computing system 500 uses the private portion of the binding key to sign an object identifying the VM. In an embodiment, hypervisor 518 determines a unique identifier for VM 520. For example, the $VM_{id}$ can be the checksum of the VM's configuration file, the MAC address of its virtual NIC, or any other unique ID based on other criteria. In general, the $VM_{id}$ together with the vTPM's measurements identifies VM 520 uniquely to $AV_{VM}$. Hypervisor 518 provides the signed object to the remote attestation server. Hypervisor 518 can also provide the public portion of the binding key along with the signed object.

At step 618, the remote attestation server verifies the signature of the signed object. In an embodiment, the remote attestation server first checks if the public portion of the binding key is on its whitelist. If so, the remote attestation server uses a public key cryptographic operation for signature checking to verify the signature of the signed object.

If both remote attestation steps 602 and 608 and the $VM_{id}$ verification step 618 succeed, then the remote attestation server has established the following: (1) only a host in possession of $BK_{host/VM\text{-}private}$ could have signed this $VM_{id}$; (2) no other host could have powered on this VM, since it could not have been in possession of $BK_{host/VM\text{-}private}$; and (3) if $BK_{host/VM\text{-}private}$ is present in the whitelist of the remote attestation server, it implies that only a trusted host could have powered on the VM.

In an embodiment, steps 608 and 618 can be combined into a single step. That is, a remote attestation server can both verify software running in a VM and verify the singed object identifying the VM using the public portion of the binding key in the same operation. The signed $VM_{id}$ can be provided to $AV_{VM}$ through the same channel as the quote and accompanying data.

As alternative to relying on two remote attestation operations, computing system 500 can employ local attestation to attest the host (e.g., step 602). In such a scheme, the binding key does not have to be ephemeral and could instead be provisioned only once on a host that is trusted. The TPM then can be used to seal the permanent binding key. By sealing the binding key against a known and trusted state of a host, the TPM would release this key only if the software measurements of a subsequent boot match those at the time of sealing.

In another embodiment, the VM is encrypted. During VM creation, its encryption can be performed using a key that is retrieved from a key server. Before powering on the VM, it needs to be decrypted. The key server performs the remote attestation steps of step 602 before releasing the key to the host, thus "tying" the VM to the trusted host. However, this approach has two limitations: (1) it requires the VM to be encrypted; and (2) it requires trust in a third-party key server The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of authenticating software executing in a computer system, comprising:
   receiving, from the computer system over a network at a server computer, a trusted platform module (TPM) quote, an event log, and a metadata database, the TPM quote provided by a TPM in the computer system, the event log including first checksums for the software executing in the computer system, and the metadata database including second checksums of binary files stored in packages from which the software is installed;
   establishing a root of trust in the computer system at the server computer based on the TPM quote and the event log; and
   determining, at the server computer in response to establishing the root of trust, integrity of the software executing in the computer system by comparing the first checksums with the second checksums.

2. The method of claim 1, wherein the step of establishing the root of trust comprises:
   verifying a signature of the TPM quote; and
   replaying the event log; and
   verifying results of the replayed event log against the TPM quote.

3. The method of claim 1, wherein the event log indicates a sequence of the first checksums, and wherein the step of replaying comprises reconstructing a state of the TPM quote based on the sequence of the first checksums.

4. The method of claim 3, wherein the step of verifying results of the replayed event log comprises comparing the state of the TPM with the reconstructed state determined by replaying the event log.

5. The method of claim 1, wherein the second checksums in the metadata database are obtained from metadata in the software packages.

6. The method of claim 5, wherein the metadata in the software packages is signed, and wherein the step of determining the integrity of the software comprises:
   verifying at least one signature in the metadata database.

7. The method of claim 6, wherein the at least one signature in the metadata database is verified by obtaining at least one public key of a respective at least one public/private key pair.

8. A non-transitory computer readable medium having instructions stored thereon that when executed by a processor cause the processor to perform a method of authenticating software executing in a computer system, comprising:

receiving, from the computer system over a network at a server computer, a trusted platform module (TPM) quote, an event log, and a metadata database, the TPM quote provided by a TPM in the computer system, the event log including first checksums for the software executing in the computer system, and the metadata database including second checksums of binary files stored in packages from which the software is installed;

establishing a root of trust in the computer system at the server computer based on the TPM quote and the event log; and determining, at the server computer in response to establishing the root of trust, integrity of the software executing in the computer system by comparing the first checksums with the second checksums.

9. The non-transitory computer readable medium of claim 8, wherein the step of establishing the root of trust comprises:

verifying a signature of the TPM quote; and
replaying the event log; and
verifying results of the replayed event log against the TPM quote.

10. The non-transitory computer readable medium of claim 8, wherein the event log indicates a sequence of the first checksums, and wherein the step of replaying comprises reconstructing a state of the TPM quote based on the sequence of the first checksums.

11. The non-transitory computer readable medium of claim 10, wherein the step of verifying results of the replayed event log comprises comparing the state of the TPM with the reconstructed state determined by replaying the event log.

12. The non-transitory computer readable medium of claim 8, wherein the second checksums in the metadata database are obtained from metadata in the software packages.

13. The non-transitory computer readable medium of claim 12, wherein the metadata in the software packages is signed, and wherein the step of determining the integrity of the software comprises:

verifying at least one signature in the metadata database.

14. The non-transitory computer readable medium of claim 13, wherein the at least one signature in the metadata database is verified by obtaining at least one public key of a respective at least one public/private key pair.

15. A computer system, comprising:

a hardware platform including a processor and memory; and a software platform executing on the hardware platform, the software platform configured to perform authentication of software executing in a computer system by:

receiving, from the computer system over a network at a server computer, a trusted platform module (TPM) quote, an event log, and a metadata database, the TPM quote provided by a TPM in the computer system, the event log including first checksums for the software executing in the computer system, and the metadata database including second checksums of binary files stored in packages from which the software is installed;

establishing a root of trust in the computer system at the server computer based on the TPM quote and the event log; and determining, at the server computer in response to establishing the root of trust, integrity of the software executing in the computer system by comparing the first checksums with the second checksums.

16. The computer system of claim 15, wherein the software is configured to establish the root of trust by:

verifying a signature of the TPM quote; and
replaying the event log; and
verifying results of the replayed event log against the TPM quote.

17. The computer system of claim 15, wherein the event log indicates a sequence of the first checksums, and wherein the step of replaying comprises reconstructing a state of the TPM quote based on the sequence of the first checksums.

18. The computer system of claim 17, wherein the software is configured to verify results of the replayed event log by comparing the state of the TPM with the reconstructed state determined by replaying the event log.

19. The compute system of claim 17, wherein the second checksums in the metadata database are obtained from metadata in the software packages.

20. The compute system of claim 19, wherein the metadata in the software packages is signed, and wherein the software is configured to determine the integrity of the software by:

verifying at least one signature in the metadata database.

* * * * *

UNITED STATES PATENT AND TRADEMARK OFFICE
CERTIFICATE OF CORRECTION

PATENT NO. : 10,754,952 B2
APPLICATION NO. : 16/042338
DATED : August 25, 2020
INVENTOR(S) : Daniel Muller, Samyuktha Subramanian and Mukund Gunti Page 1 of 1

It is certified that error appears in the above-identified patent and that said Letters Patent is hereby corrected as shown below:

In the Specification

Column 6, Line 7, "(TO)" should read, --(IO)--.

Signed and Sealed this
Fifteenth Day of December, 2020

Andrei Iancu
*Director of the United States Patent and Trademark Office*